United States Patent [19]

Bettenhausen

[11] Patent Number: 5,678,772
[45] Date of Patent: Oct. 21, 1997

[54] UNIVERSAL COUPLER FOR IN-LINE COUPLING DRIVE SHAFTS TOGETHER IN A MOTOR DRIVEN IRRIGATION SYSTEM

[76] Inventor: Roger V. Bettenhausen, 5 Lakewood Dr., Columbus, Nebr. 68601

[21] Appl. No.: 556,331

[22] Filed: Nov. 13, 1995

[51] Int. Cl.⁶ .................................................. B05B 3/00
[52] U.S. Cl. .......................... 239/744; 403/291; 403/383; 403/337; 464/98; 464/182
[58] Field of Search .............................. 239/728, 735, 239/737, 742, 744; 403/3, 4, 337, 291, 383; 464/87, 98, 182

[56] References Cited

U.S. PATENT DOCUMENTS

| | | | |
|---|---|---|---|
| 3,405,760 | 10/1968 | Smith | 464/98 X |
| 3,867,050 | 2/1975 | Pitner | 403/383 X |
| 4,350,295 | 9/1982 | Gheen | 239/735 X |
| 5,221,232 | 6/1993 | Nameny | 464/98 |

OTHER PUBLICATIONS

Nebraska Irrigation, Inc. catalog pp. 7–10.
Nebraska Irrigation, Inc. brochure "NI Drive Train Kits".

*Primary Examiner*—Andres Kashnikow
*Assistant Examiner*—Steven J. Ganey
*Attorney, Agent, or Firm*—Emrich & Dithmar

[57] ABSTRACT

A universal coupler for use on a tower leg assembly of an irrigation system for joining an outboard drive shaft of a drive wheel gear box of circular cross-section and known size to a motor-driven square drive shaft of unknown size. The universal coupler includes, along a first longitudinal end thereof, a shaft receiving structure for fixedly containing the outboard drive shaft, and along the opposite longitudinal end, a V-shaped cradle dimensioned to accommodate therein adjacent flat wall surfaces of the square drive shaft. A flexible, shock absorbing disk joins the V-shaped cradle and the outboard drive shaft receiving structure in a manner whereby each shaft is rotated at the same speed in response to a rotational force imparted on the other. L-shaped bolts are provided to facilitate clamping the square drive shaft to the V-shaped cradle using fasteners.

8 Claims, 2 Drawing Sheets

UNIVERSAL COUPLER FOR IN-LINE COUPLING DRIVE SHAFTS TOGETHER IN A MOTOR DRIVEN IRRIGATION SYSTEM

BACKGROUND OF THE INVENTION

1. Field of the Invention

The present invention relates generally to the field of couplers of the type used for connecting a driving shaft member to a driven shaft member and, more particularly, to a universal coupler for use in coupling power to drive wheels in irrigation systems.

2. Description of the Prior Art

Overhead irrigation systems include two basis types—those with a center pivot wherein the support structure moves in a circle, and those which move in line across a field. The latter type are known in the art as "lateral move" systems. The present invention is equally applicable to these and other irrigation systems, are persons in this art will readily appreciate. However, the invention will be illustrated in the context of a center pivot system.

Thus, reference numeral 10 in FIG. 1 designates a center pivot irrigation system having a line of water pipes 11 with sprinklers spaced along their length. The pipes 11 are supported above the ground upon spaced, mobile, self-propelled towers 12, as is well known. The pipeline is pivotally mounted at an inner end (the center) near the well or water source so that the succession of towers 12 travel in circles around the well to irrigate a relatively large circular area. Thus, a "center pivot" irrigation system travels a full circle. The system can be stopped at any given point in the field. Control is by way of a main panel mounted at the center pivot point.

The towers 12 are individually motor-driven and flexibly joined to pipe lengths 11 and to each other by flexible joint members 13 and arms 14 disposed on either side thereof. Each tower 12 is defined at a base thereof by a tower leg assembly 20, including a front wheel 21 and a rear wheel 22 coupled to a motor drive system having a drive shaft assembly 30 extending in the direction of travel.

The drive system includes an electric motor 31 mounted to a center gear box 32. The center gearbox 32 drives front and rear drive wheel gear boxes (not shown) which are directly bolted to the front and rear drive wheels 21, 22, respectively. The center gearbox 32 has round outboard shafts 33, 34 that extend out its front and rear end-sides and connect to associated front and rear drive shaft engaging couplers 35, 36 which couple to the proximal ends of associated front and rear square drive shafts 37, 38, typically of ¾", ⅞", or 1" square dimensions. The opposite or distal ends of the front and rear drive shafts 37, 38 drive the associated outboard round shafts on the front and rear drive wheel gear boxes. Drive wheel engaging couplers (not shown), are used to couple the distal square cross-section ends of the shafts 37, 38 to the round cross-section ends of the shafts extending from the drive wheel gear boxes (not shown). All in all, therefore, each tower leg assembly 20 typically consists of four couplers.

Because the drive wheel engaging couplers are subject to heavy load stresses during irrigation over rocky or differing grade soil conditions, these couplers are designed to be flexible and shock absorbing and come in a wide variety of specific sizes. Typically, heavy duty shock-absorbing couplers consist of two pair of unique interlocking castings, where one of the pairs capsulates therebetween the outboard shaft of a drive wheel gear box, which is round in cross-section, and the other pair capsulates the driving end of the square drive shaft which is driven by the motor-driven center gear box 32.

The interlocking castings are constructed so as to clamp around, using screws or the like, the associated shaft end seated therebetween. While there are couplers of unitary construction which are more simple in construction than couplers consisting of interlocking castings, castings have been shown to be highly flexible and shock absorbing and better at tolerating the rough travelling conditions which towers 12 are subjected to as they are driven over an area of land with differing grades.

An inherent drawback of all irrigation type couplers, however, is that they are necessarily uniquely sized to join shafts of specific dimensions. While the outboard shaft end of most drive wheel gear boxes is typically of fixed size, motor-driven square drive shafts, normally coupled between a center gear box and a drive wheel gear box, come in a wide variety of sizes. Consequently, conventional couplers constructed to couple around shafts of a particular or specific size cannot be used with similar shafts of a different size.

It would be a great advancement in the art to be able to provide a universal coupler which can accommodate different size square shaft ends without compromising the flexibility and shock absorbing properties common in non-universal couplers, such as found on couplers constructed with interlocking castings.

SUMMARY OF THE INVENTION

The present invention provides a universal coupler for use on a tower leg assembly of an irrigation system, which is economical, reliable, easy to manufacture and easy to install in the field. The invention provides a universal coupler for joining the round outboard end of a drive wheel gear box to an end of a square drive shaft driven by an electric motor mounted on a center gear box of a tower leg assembly. The structure is highly flexible and shock absorbing.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE PREFERRED EMBODIMENTS

Figure 1:
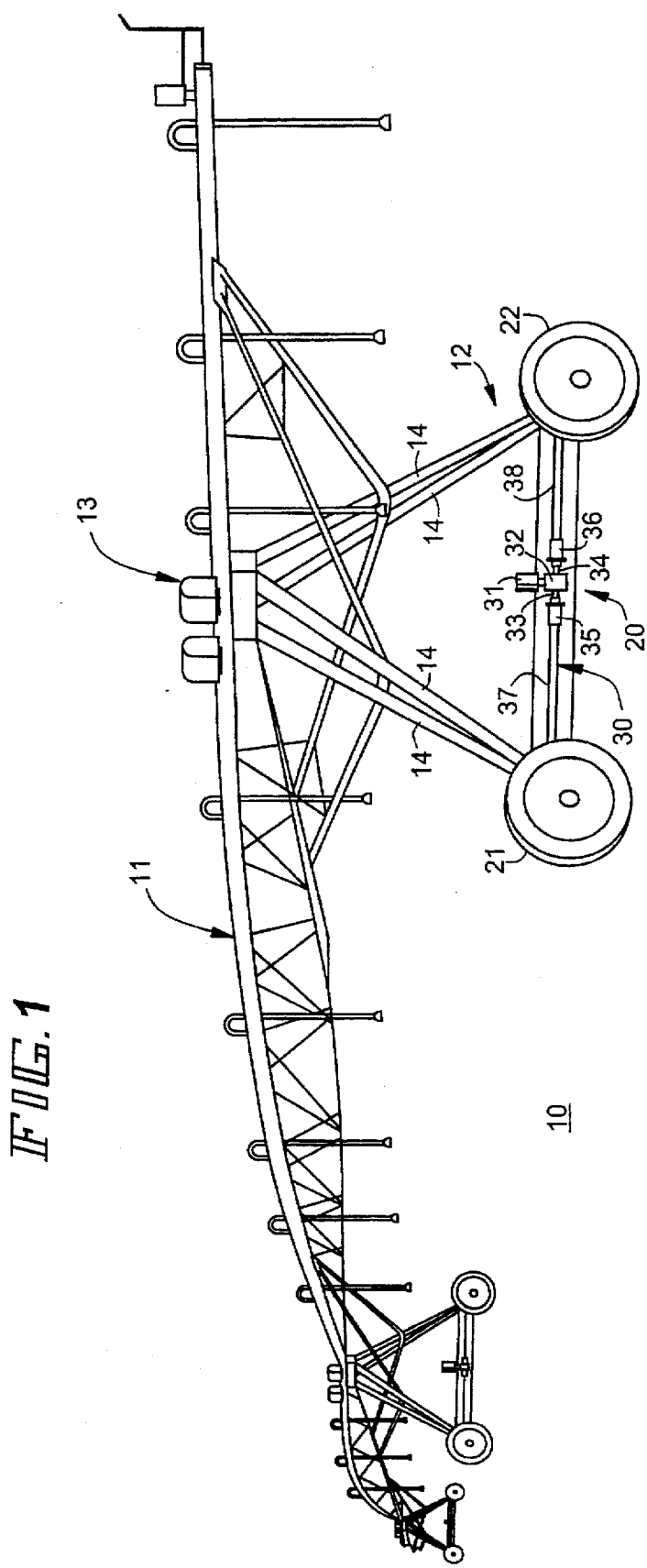
FIG. 1 is a perspective of a center pivot irrigation system with sprinkler-carrying pipe lengths supported by upstanding towers taken from the periphery of the circular path of the system.
Figure 2:
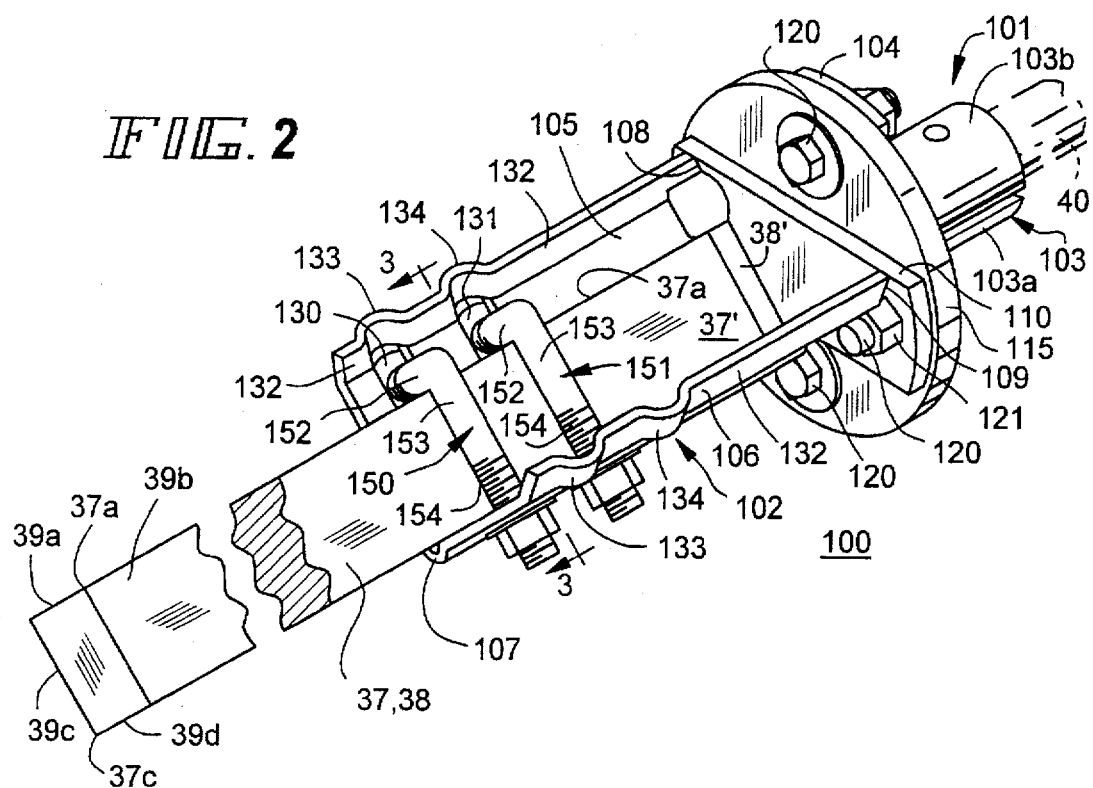
FIG. 2 is an isometric view of a universal coupler shown connecting an end of a square drive shaft to an end of a round outboard shaft, shown in phantom, of a drive wheel gear box in accordance with the present invention.

Referring to FIG. 2, there is illustrated a universal coupler 100 constructed in accordance with and embodying the features of the present invention. The universal coupler 100 is constructed to receive at one end 101, the outboard shaft end 40 (having a circular cross section and shown in phantom) from an associated drive wheel gear box mounted to either the front or rear drive wheel 21, 22, respectively, of a tower leg assembly 20 of the type described above in connection with FIG. 1. The universal coupler 100 has a V-shaped cradle or receptacle 102 disposed opposite end 101 and dimensioned to receive the distal end of an associated shaft 37 (front) or 38 (rear) which extends from the motor-driven center gear box 32. End 101 consists of a circular plate 103 including upper and lower cylindrical interlocking members 103a, 103b extending from a first flat, elongated base portion 104 and forming a receptacle for the round shafts 40. The V-shaped cradle 102 is defined by two longitudally extending walls 105, 106 substantially at right angles to each other joined along a common edge 107. Common edge 107 is defined by an annular curve of tear-drop shape the function of which is described below. Walls 105, 106 are uniformly joined at respective end surfaces 108, 109 thereof to a second, flat elongated base portion 110.

The universal coupler 100 further includes a heavy-duty circular-cylindrical rubber disk 115 made of highly shock absorbing and flexible fiber material. Disk 115 includes four through-holes in cross arrangement for fastening each of the first and second elongated flat base portions 104, 110 thereto using appropriately sized bolts 120. The bolts 120 are slid through the holes on the disk 115 to communicate with like sized holes on each of the base portions 104, 110. The nuts 121 are shown in threaded engagement with the protruding shafts of bolts 120, securely attaching each of the base portions 104, 110 to the flexible disk 115, and unitarily joining the V-shaped shaft-receiving cradle 102 to the circular shaft-receiving plate 103. Washers are placed beneath the heads of the bolts to spread the stress over a wider area. The construction and dimensioning of the disk 115 and circular plate 103 are not critical, and differ only in their cooperative use with a V-shaped cradle 102, the latter constructed in a manner accommodating, in a unique clamping configuration to be described below, any one of a number square drive shafts of differing sizes.

As previously explained, the V-shaped cradle is sized to encapsulate therein the end 37' of a square drive shaft 37. Toward this end, the shaft end 37' is seated within the cradle 102 with the adjacent bottom two of its flat surface walls engaging the corresponding inner flat surfaces of walls 105, 106. The end 37' of the shaft is spaced slightly from the facing surface of base 110, as at 38'.

The V-shaped cradle 102 includes a pair of parallel, elongated slots formed in each of the walls 105, 106 and extending vertically with respect thereto. The topmost portion 132 of each of walls 105, 106 is angled or flanged and extends the whole longitudinal length of the walls. Wall portion 132 are fluted or curved at the portions 133, 134 thereof extending over associated slots 130, 131, as best seen in FIG. 3.

L-shaped bolts 150, 151 are provided to securely clamp the square drive shaft end 37' to the V-shaped cradle 102, and specifically, to the walls 105, 106, the shape of each being a mirror image of the other.

L-shaped bolts 150, 151 are each defined by legs 152, 153 of equal length joined at right angles to each other, and including threads 154. Washers 160 and nuts 170 serve to couple bolts 150, 151 to the walls 105, 106, clamping the drive shaft end 37' within the V-shaped cradle 102.

Figure 3:
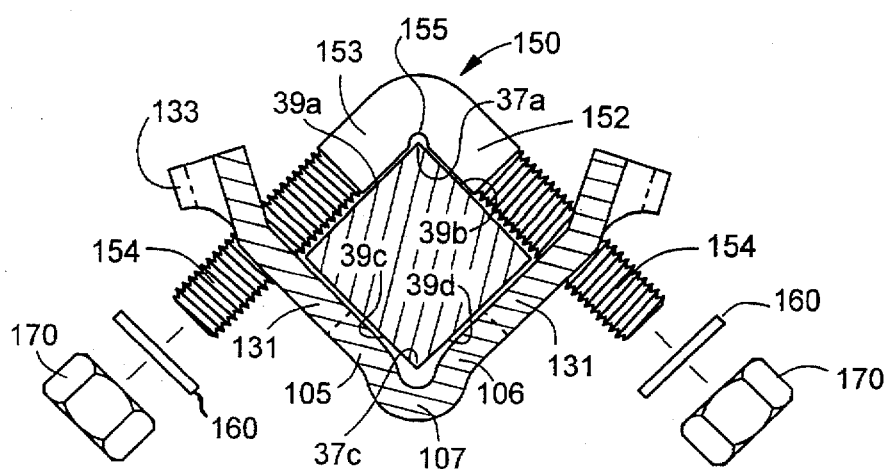
FIG. 3 is cross-sectional view taken generally along the line 3—3 in FIG. 2, with certain elements shown in exploded relation.

Referring now to FIG. 3, a dimple or recess 155 is provided at the junction between the legs 152, 153 of L-shaped bolts 150, 151 to allow sufficient clearance to accommodate the corner 37a of different size shafts 37. The tear-shaped edge 107 at the junction between walls 105 and 106 also forms a groove to provide clearance for the bottom corner 37c of shaft 37, and to permit the walls 105, 106 of the cradle 102 to engage fully the walls of the square shaft.

The right-angle L-shaped bolts 150, 151 facilitate positive clamping of square drive shafts 37 of different cross-sectional sizes to the coupler 100. The legs of the bolts are drawn against the outer flat surfaces designated 39a and 39b of the square (or rectilinear) drive shaft 37; while the inner surfaces 39c, 39d of the drive shaft 37 are drawn tightly against the flat side walls 105, 106 of the V-shaped cradle 102.

The threaded legs 154 of bolts 150, 151 are sized to fit through the associated slots 130, 131 and to slide vertically relative thereto until seated against the flat side surfaces of the square drive shaft end 37'. Once seated, washers 160 and nuts 170 are threadedly engaged, pulling the bolts 150, 151 as well as the cradle walls 105, 106 tight against the shaft side surfaces 39a, 39b thereby clamping the shaft 37 within the cradle 102. It should further be appreciated that the fluted construction (portion 134) of topmost wall portion 132 captivates the bolts 150, 151 within their respective slots 130, 131.

While the preferred embodiment is described in connection with a center pivot irrigation system, it should be readily apparent that the universal coupler 100 would be useful in other types of irrigation systems where shafts of varying sizes are employed. Further, the shaft described as having a square cross-section could have a slightly rectangular shape, if desired.

While particular embodiments of the present invention have been shown and described, it will be appreciated by those skilled in the art that changes and modifications may be made without departing from the invention in its broader aspects. For example, without limiting the invention, the illustrated embodiment discloses the universal coupler coupling a drive shaft to a drive wheel gear box. The coupler could equally well be used to couple the square drive shaft to the center drive gear box or in any other situation for in-line coupling of a square shaft to another shaft (round or, itself, square or rectilinear). Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. In a motor-driven irrigation system having first and second shafts, said second shaft having a rectilinear cross-section, a coupler for in-line coupling said shafts together, comprising:

a first receptacle for receiving and coupling to said first shaft;

a cradle having first and second adjacent, connected walls arranged in a general V-shape to receive an end of said rectilinear shaft and to engage adjacent surfaces thereof and including first and second elongated slots in said first and second flat walls, respectively;

an angle bolt having first and second threaded legs, each leg received in associated areas of said first and second slots respectively;

first and second nuts received on said first and second threaded legs of said angle bolt for drawing said angle bolt tightly against outer sides of said rectilinear shaft and for drawing inner sides of said rectilinear shaft against the flat walls of said cradle; and means for mounting said first receptacle and said cradle together such that the respective axes of said first and second shafts are generally aligned when assembled together.

2. The coupler of claim 1 wherein the flat walls of said V-shaped cradle are longitudinally extending and joined at common end surfaces at right angles to each other, the non-common end surfaces opposite said common end surfaces being partially flanged and dimensioned to provide sufficient clearance to allow the angle bolt to seat against the corresponding side of the rectilinear shaft to clamp it within the cradle.

3. The coupler of claim 2 wherein said mounting means comprises a shock absorbing flexible body having parallel side surfaces for mounting said first receptacle and said cradle respectively.

4. The coupler of claim 2 wherein the flat walls of said cradle are longitudinally extending and joined at a common junction, said junction being tear-drop shaped to provide clearance to allow the rectilinear shaft to seat against said flat walls.

5. The coupler of claim 4 characterized in that said cradle is dimensioned to accommodate ¾" through 1" square shafts.

6. The coupler of claim 5 wherein said first shaft is round in cross-section and said first receptacle is cylindrical.

7. The coupler of claim 1 wherein said irrigation system is a center pivot irrigation system.

8. The coupler of claim 1 wherein said irrigation system is a lateral move irrigation system.

* * * * *